United States Patent [19]

Miller et al.

[11] Patent Number: 5,500,236

[45] Date of Patent: Mar. 19, 1996

[54] NON-FRIED FLAVORED RAMEN NOODLES

[75] Inventors: Harry E. Miller, New Egypt; Paul Pak, Franklinville; Steven M. Schechter, Manalpan, all of N.J.; Vien-An T. Huynh, Media, Pa.

[73] Assignee: Campbell Soup Company, Camden, N.J.

[21] Appl. No.: 318,436

[22] Filed: Oct. 5, 1994

Related U.S. Application Data

[63] Continuation of Ser. No. 262,066, Jun. 17, 1994, abandoned.

[51] Int. Cl.[6] ........................................... A23L 1/16
[52] U.S. Cl. .................................... 426/451; 426/557
[58] Field of Search ................................ 426/451, 557

[56] References Cited

U.S. PATENT DOCUMENTS

| | | | |
|---|---|---|---|
| 3,615,677 | 10/1971 | Scharschmidt | 426/557 |
| 4,098,906 | 7/1978 | Hisaki et al. | 426/94 |
| 4,230,735 | 10/1980 | Yoshida et al. | 426/557 |
| 4,234,617 | 11/1980 | Sakakibara et al. | 426/557 |
| 4,243,689 | 1/1981 | Kokeguchi et al. | 426/557 |
| 4,370,352 | 1/1983 | Murakami et al. | 426/557 |
| 4,473,593 | 9/1984 | Sturgeon | 426/461 |
| 4,483,879 | 11/1984 | Sugisawa et al. | 426/451 |
| 4,728,520 | 3/1988 | Yamaya et al. | 426/94 |
| 4,783,339 | 11/1988 | Horner | 426/557 |

*Primary Examiner*—Jeanette Hunter
*Attorney, Agent, or Firm*—Baker & Botts

[57] ABSTRACT

Methods for drying instant-cooking ramen noodles and to dried noodle products. Noodles are prepared by mixing flour and water into a dough. The dough can be shaped into noodles and precooked with steam. The steamed noodles are dried with a flow of high velocity air at temperatures of greater than 145° C. to a moisture content of less than about 20%. Once dried, the products can be packaged as a brick, a flavor packet added and the packaged article stored at ambient temperatures for long periods of time.

52 Claims, No Drawings

NON-FRIED FLAVORED RAMEN NOODLES

REFERENCE TO RELATED APPLICATIONS

This patent application is a continuation of U.S. patent application Ser. No. 08/262,066, filed Jun. 17, 1994, and now abandoned.

BACKGROUND OF THE INVENTION

1. Field of the Invention

This invention relates to instant-cooking noodles and to methods for the preparation of instant-cooking noodles using an efficient drying process which does not involve oil frying and can be entirely fat-free. These non-fried noodles are healthier than fat-fried noodles and possess both a desirable appearance and taste.

2. Description of the Background

Instant-cooking noodles are precooked and dried alimentary paste which, when immersed in boiling water, rehydrates within minutes to form edible products that can be used in soups and stews, or as side dishes or snacks. These quick-cooking noodles are typically purchased as a dried brick of noodles with spice packets that provide a desirable flavor and appearance to the resulting foodstuff.

One group of instant-cooking noodles are ramen noodles. Ramen noodles are prepared from alimentary paste which comprises wheat flour, salts and spices, but does not contain egg whites or egg solids. The absence of egg makes the dough difficult to work with and the dried noodles fairly fragile.

The most common method of preparing raw noodles is to pass the dough through shaped extrusion orifices. This is generally not possible with the large scale manufacture of ramen noodles. Extruded dough is typically too rigid and rehydrates poorly. Instead, ramen dough is sheeted or rolled into long flat layers which are sliced or cut into ribbons of noodles. The ribbons are steamed for short periods of time, cut to specified lengths and fried in, for example, palm oil or a combination of oils heated to between 125° C. to 180° C. for less than one minute. Frying imparts a desirable appearance and taste to the resulting noodle product. The noodles absorb a small amount of the oil which browns and gives the noodles a desirable fried flavor.

Fried noodles have a low moisture content which does not need to be reduced for extended storage. Noodle moisture content is between about 1% to 5% which allows for long term storage without the need for refrigeration. However, over time, oils within the noodles tend to oxidize. This oxidation produces a rancid odor and taste which, although not necessarily harmful, imparts a distinctive flavor to the product and limits its shelf life.

Several methods have been developed for the preparation of instant-cooking noodles which do not involve frying. In one method (U.S. Pat. No. 2,704,723), noodles are formed and precooked entirely with steam. However, using steam precooking, it is difficult to precisely determine when the noodles are adequately precooked. Starch within the noodles must be sufficiently gelatinized to achieve a discrete firmness and moisture content without being overcooked. The gelatinization process is referred to as alpha-conversion of the noodle starches. When water penetrates the noodle, the polymeric structure of the individual starch granules become hydrated and the noodles swell. When swelling is sufficient so that no crystallinity can be observed, the noodles have been sufficiently precooked. Ready-to-eat noodles have an alpha-conversion of around 85% (±10%). The final alpha conversion occurs when the dried noodles are rehydrated with hot water.

Breakage or beta-conversion of the starch molecules occurs on overcooking. Oxidation of the oils also promotes beta-conversion. Overcooked noodles are limp and deteriorate. After a certain degree of beta-conversion has occurred, the noodles are no longer edible.

As a consequence of steam precooking, noodles have a high moisture content. However, to be shelf-stable, this moisture must be removed and a drying process added. The common shaped dough drying methods employ moderate temperatures and require many hours of drying to reduce the water content below 15% for packaging. Drying is performed by passes through warmed air ovens at temperatures of less than 65° C. (U.S. Pat. No. 4,783,339). Many cycles of heating and cooling are often required. The costs associated with the additional time and space requirements necessary are considerable. Typical drying temperatures vary between about 45° C. to about 110° C., but temperatures as high as 130° C. have sometimes been used (U.S. Pat. No. 4,234,617). Higher temperature drying has been shown not to be useful because noodle texture is compromised. The resulting product has a high degree of beta-conversion and becomes scorched imparting a burned flavor. Additionally, at these higher temperatures, noodles easily overcook as α-conversion rates cannot be satisfactorily controlled. Lower temperatures of between about 80° C. to 110° C. are preferred. However, temperatures below 80° C. produce noodle shrinkage and reduce drying efficiency. Large drying storage units are required which greatly increases costs.

Conventionally air dried noodles still suffer from numerous additional drawbacks. The noodles themselves are unpleasing to the eye, having a washed out appearance, a rubbery mouth feel and, in the absence of oil, are bland and tasteless.

Methods that have addressed these problems have been directed at modifying the various components of the dough and their quantities. In U.S. Pat. No. 3,192,049, paste composition is adjusted to contain a small amount of a proteinaceous material such as soy flour or wheat gluten. These substances improve palatability and noodle texture. Although cooking times were shortened, noodle texture, taste and appearance were not improved. In U.S. Pat. No. 4,423,082, noodle dough was supplemented with a hydrolyzate of a starch derived from the root or the stem of a plant. The presence of the hydrolyzate starch increases the rate of water absorption and produces a more evenly precooked noodle in a shorter amount of time. Again, noodle texture was improved, but in the absence of oil, the product still had a washed out taste and appearance. Also, the dough itself was difficult to handle during manufacturing and individual noodles blistered and cracked when dried so there was a significant amount of waste.

A similar method, described in U.S. Pat. No. 4,230,735, uses a modification of this process whereby a fat or oil is substituted for the added starch. The drawbacks associated with non-fried noodles are somewhat overcome in that noodle taste is improved, however, fat content is very high, higher in most cases than traditionally fried noodles. In addition, due to the presence of the oil, drying is a lengthy process requiring many hours at moderate temperatures (30°–60° C.). Higher temperatures cannot be used because the rate of oil or fat oxidation increases, shortening product shelf life by producing undesirable odors.

In another non-frying process, noodles are coated with edible oil emulsifiers prior to steaming (U.S. Pat. No.

4,098,906). This technique achieves a noodle product which is similar to the fried noodle, but without frying. Noodles have the fried or oily taste which is organoleptically pleasing, and the texture to withstand the drying process without blistering or cracking. However, most of the negative aspects of frying are retained as well. The fat content of the resulting foodstuff is fairly high. Rancidity and cooking difficulties remained as problems.

Another process which attempts to overcome problems associated with drying requires precooking of the noodles in super-heated steam. Noodle precooking times are reduced and noodles can be rapidly dried in blowing air at between 35° C. to 65° C. Noodle surfaces have an increased evaporation rate. Warmed air blown on the noodles reduces noodles moisture content below 15% in minutes. Although rapid, the overall process is somewhat inefficient as condensation instantly forms on noodle surfaces after precooking. This initially raises the moisture content of the noodles higher than occurs with conventionally steamed noodles. The extra moisture must be eliminated before the moisture content of the noodle can be lowered. Super-heated steam is also somewhat dangerous and expensive to produce and utilize. Further, product flavor and palatability are not improved and noodles produced are rubbery and tasteless. Only when oil is added as a component or an emulsion does noodle flavor become acceptable (U.S. Pat. No. 4,098,906).

An alternative approach has been used wherein the dough is produced as a web, and dried in a two step process (U.S. Pat. Nos. 4,243,689 and 4,370,352). With this method, noodle dough is passed through a large die extruder under pressure forming a web. The web is steamed to produce α-conversion of the starch components. After steaming, the web is subjected to a preliminary drying step during which the water content of the web is reduced to below 35%. After preliminary drying, the web is cut into the desired noodle shapes and finally dried. These noodles are stated to have a more uniform α-conversion of the starch components and a reduced tendency to stick together during production. Noodle quality may be significantly increased, but a two step process is time consuming and fairly labor intensive. Multiple drying apparatuses must be included in an assembly line for any large scale production which greatly increases costs.

SUMMARY OF THE INVENTION

The present invention overcomes the problems and disadvantages associated with current strategies and designs and provides new methods for the preparation of noodles having the taste, appearance and ease of handling of fat-fried noodles, but do not require oil frying.

One embodiment of the invention is directed to methods for drying noodles without frying. Flour and water are mixed into a dough which is shaped into noodles. The noodles are precooked in a fluid such as steam. The precooked noodles are dried in a flow of high velocity air for less than 30 minutes and at a temperature above 130° C. This process is efficient and inexpensive, and can be performed in a single step. Frying is not required to reduce the water content of the noodles, nor are oil coatings required on the noodles. Noodles produced have a desirable flavor, texture and appearance, not expected in the absence of frying.

Another embodiment of the invention is directed to methods for producing a ramen noodle product having a baked flavor and firm texture without frying. Flour is mixed with between about 10% to about 60% water, by weight, to form a dough and the dough shaped into ramen noodles. The noodles are precooked by steaming for between about 1 minute to about 30 minutes. The baked flavor and firm texture is created by rapidly drying the precooked noodles in one step with a flow of high velocity air at between about 2,000 to 10,000 feet per minute and at a temperature of between about 130° C. to about 210° C. The final moisture content is less than 20%. The dried noodles are packaged to form the ramen noodle product. These noodles can be supplemented with a flavor packet containing a wide variety of flavors or, alternatively, additional ingredients may be added to the dough or the uncooked noodles.

Another embodiment of the invention is directed ramen noodle products prepared by steaming uncooked dough in the shape of noodles for between about 30 seconds to about 10 minutes. The precooked noodles are dried in one step with a flow of high velocity air at between about 2,000 to 10,000 feet per minute and at a temperature of between about 130° C. to about 210° C. for less than 30 minutes to a final moisture content of less than 20%. The dried noodles are packaged to form the ramen noodle product. This type of drying imparts a baked flavor and firm texture to the noodles. The noodle product is shelf stable for greater than one year. As the process does not involve frying and can be performed in the absence of oil, the noodle product may be low fat and low calorie.

Another embodiment of the invention is directed to a method for producing ramen noodle products. These products are formed by mixing different types of flour to form a dough which will impart a desired texture or taste to the resulting noodles. Useful flours include red wheats, durum wheats, white wheats and mixed wheats. Desirable blends may comprise between about 40% to about 80% hard wheat flour and between about 20% to about 60% soft wheat flour. The flour is mixed with water forming a dough which is shaped into noodles. Noodles are precooked with a heated fluid such as steam for between about 1 minute to about 10 minutes, dried in a flow of high velocity heated air to a final moisture content of less than 20% and packaged. Noodles of these compositions and prepared according to these methods have a desirable taste and texture which produces a high quality product.

Another embodiment of the invention is directed to articles of manufacture which comprise instant-cooking noodle products. The products contain noodles which have been dried with a flow of high velocity air at between about 2,000 to 10,000 feet per minute at a temperature of between about 130° C. to about 210° C. for less than 30 minutes. The final moisture content is less than 20%, and the resulting dried noodles packaged in a disposable container with a flavoring.

Other embodiments and advantages of the invention are set forth, in part, in the description which follows and, in part, will be obvious from this description or may be learned from the practice of the invention.

Description of the Invention

As embodied and broadly described herein, the present invention is directed to methods for drying instant-cooking noodles and to the dried noodle products. These instant-cooking noodles are reconstituted in heated water and can be used in soups, stews, side dishes or snacks for human consumption. Noodles produced have an organoleptically desirable taste, appearance and texture, and are healthier than fried noodles and noodles prepared with oils.

One embodiment of the invention is directed to a method for drying noodles without frying. Noodles are prepared from dough which contains predominantly flour and water. By weight, water may comprise between about 28% to about 80% of the dough and is preferably between about 30% to about 40%. A wide variety of flours may be used alone or in combination such as, for example, wheat flour, farina flour, sorghum flour, buckwheat flour, soybean flour or rice flour. Blends can be used to create a desired texture. Additional ingredients may also be added to obtain a desired consistency or texture to the dough (gums, acids, enzymes, proteins, oils, salts), or a pleasing color (natural and artificial coloring agents) or flavor (spices, salts, dairy products, sugars, herbs, oils, natural and artificial flavoring agents) to the noodles. Nutritional content can be improved by supplementing the dough with vitamins and minerals and shelf life can be extended with the addition of preservatives, acids or salts. Small quantities of potato, tapioca or corn flour can further add characteristic flavors or provide a desired texture to the noodles. Additional ingredients which may be added for any of these purposes include alcohols, starches, enzymes and dairy products.

The preferred embodiment of the invention utilizes ramen noodles and the invention will be further described in reference to ramen noodles. However, it is understood that the claimed methods and products may comprise other types of alimentary paste besides ramen. Ramen noodles are characterized from other types of noodles by both taste and texture. For example, most non-ramen noodles contain about 5.5% egg solids whereas ramen noodles contain no egg solids or whites. Noodle texture is somewhat firmer than other types of noodles with a distinctive crispness and hard feel. Taste is also unique having a fried or cooked flavor.

The typical ramen noodle is comprised of predominantly wheat flour. Useful wheat varieties include hard red spring, durum and red durum, hard and soft red winter white and mixed wheats. White wheat varieties further include hard and soft white, white club and western white. Preferred blends include combinations of winter wheats and white wheats. Also preferred are wheat blends of between about 40% to about 80% hard wheat, more preferably between about 50% to about 60%, and between about 20% to about 60% soft wheat, more preferably between about 40% to about 50%. Noodles of these compositions have a firm texture with a high degree of porosity, both desirable features for the production and manufacture of instant-cooking noodles and particularly ramen noodles.

The flour, water and extra ingredients, if any, are mixed, to obtain the desired consistency and sheeted onto a surface as a layer of dough. The sheeted dough is worked by passing through a series of reduction rollers to obtain a desired thickness. The thickness of the rolled dough is between about 0.5 mm to about 4 mm, preferably between about 0.5 mm and 2.0 mm, and more preferably between about 0.8 mm and about 1.2 mm. The preferred sizes are uniform and allow for even precooking and drying. As noodles are solid or in other words without a continuous cavity, thickness is also directly related to the precooking and drying times and temperatures. Thicker noodles require increased times for both precooking and drying as the ratio of volume to surface area is increased.

After the dough has been sheeted, it is shaped, for example by slicing the dough into long ribbons using, for example, a slitter that cuts 20 strands per 3 cm. Optionally, a coating may be applied to the dough or ribbons of noodles prior to precooking. Coatings comprise one or more of the same ingredients that may have been added to the dough above, plus at least one additional possible ingredient, water. Applying a coating of water to the dough during processing prevents patching that can occur when specific areas of the dough dry unevenly. Coatings can also be used to impart desired flavors to the noodles. Ingredients of the coating would be absorbed through the porous noodle surfaces.

Precooking gelatinizes the dough and is performed in a heated fluid which is a medium such as, for example, boiling water or steam at between about 80° C. to about 120° C., and preferably at between about 90° C. to about 110° C., and more preferably at between about 100° C. to about 105° C. The precooking fluid may also be pressurized which lowers precooking temperatures and times. Other fluids which can be used include water-based solutions containing one or more salts, buffering agents, preservatives, flavorings or other products which, when introduced to the fluid, impart a desired flavor or characteristic to the noodles. Precooking times vary between about 30 seconds to about 15 minutes, preferably less than 10 minutes and more preferably less than 5 minutes, and even more preferably between about 1 minute to about 2 minutes.

The precooked noodles have an alpha-conversion of between about 70% to about 90%, preferably between about 75% to about 85% and more preferably 80%. As little if any oil has been used in processing, and precooking temperatures are around 100° C., there should be no significant amount of beta-conversion. The precooked noodles, which now have a water content of between about 30% to about 60%, are ready to be cut and dried.

The ribbons of steamed noodles are cut to predetermined lengths using, for example, a fly knife cutter. Cutting increases ease of handling during processing and again helps provide for an evenly precooked product. Shorter noodles are generally preferred for soups and long noodles as a main course meal. Noodles can be cut to nearly any length from short noodle pieces to long strands. Ramen noodles are of moderate length, between about 1.0 cm to about 100 cm, preferably between about 20 cm to about 60 cm and more preferably between about 15 cm to 25 cm.

Drying is performed using high temperatures in the presence of hot air moving across or through noodle surfaces at high velocities. Preferably, air flow is directed at and through the noodles. The speed of the moving air is between about 2,000 to about 10,000 feet per minute, and preferably about 6,500 feet per minute. Although the exact amount is highly variable, depending on a number of parameters, generally between about 5 pounds to about 25 pounds of air are used for every pound of moisture removed and preferably about 10 to 15 pounds. With similar regard, about 3 pounds of noodles release about 1 pound of water and between about 2 pounds to about 25 pounds of air are used per pound of noodle product. Ambient air is commercially suitable and may be selectively dried or filtered. When used in drying noodles, the air may be supplemented with other components such as compounds which assist in the absorption of water. Other gasses or mixtures thereof which do not affect the properties or edibility of the final product may also be employed in place of the air.

Drying temperatures are above 130° C., preferably above 145° C., and more preferably above 175° C. Heat and mass transfer varies proportionately with noodle geometry, temperature and with the velocity of blowing air. For example, increased temperatures shorten drying times, but may also require increased air velocities directed at the noodles to prevent scorching. For example, typical drying times for temperatures between about 130° C. to about 210° C. are less than about 15 minutes. Drying times for temperatures greater than about 145° C. are less than about 8 minutes, and drying times for temperatures greater than about 175° C. are less than about 4 minutes. In addition, these drying methods produce a noodle with a somewhat firmer texture. Noodles are less susceptible to breakage during storage, but retain an acceptable and even desirable mouth-feel after reconstitution with boiling water. The crisp, firm texture of the noodle is maintained.

Most any type of dryer can be used including an impingement oven, an electric or gas oven, a convection oven, a dielectric oven, an air circulation dryer or a combination of these dryers. Preferably, the dryer is a single or double impingement oven having air blown in from one or two, or more, different directions. Again, it is preferred that air flow be directed at and through noodle surfaces. For economical considerations, a single drying step is preferred, but multiple dryers may also be used as well as multiple passes through a single type of dryer.

Preferred drying temperatures for an impingement oven are between about 140° C. to about 185° C. Drying times are less than about 15 minutes and preferably between about 2 minutes to about 8 minutes. Other types of ovens which can be used also have preferred drying temperatures and times. For example, drying temperatures in circulation dryers is between about 130° C. to about 205° C. taking less than 30 minutes to adequately reduce moisture content and preferably between about 3 minutes to about 12 minutes. Drying procedures reduce moisture content to below about 20% and preferably below 15% and more preferably between about 5% to about 15%, for long term storage at ambient temperatures without refrigeration.

Precooked noodles expand to about twice their initial size or to between about 1.0 mm to about 8 mm in diameter, depending upon the composition of the initial dough and the precooking fluid. This expansion or puffing of the dough is uniform and without surface cracks and increases uniform porosity in the final food product.

These procedures can also be used for shorter periods of time, such as half the stated periods, when moisture content does not need to be reduced as low. These types of noodles are dried, albeit to a reduced degree, and quick frozen or refrigerated. Noodles that are to be stored refrigerated or frozen have a moisture content of between about 20% to about 35% or higher. Storage times are not decreased because the noodle products are maintained refrigerated or frozen. This may be useful or convenient when the noodles are prepared for addition to another product such as a stew containing multiple vegetables and/or meats which must be refrigerated or frozen. In such cases, it may be preferable for the degree of water retention to be similar to the moisture content of the total food product.

Optionally, a coating may be applied to the noodles after precooking and prior to drying. Coatings may comprise additional ingredients to enhance the flavor, appearance or texture of the noodles and can be applied by spraying, immersing, brushing or powdering onto the noodles. The coating may comprise one or more ingredients typically used in soups or noodle dishes. Examples of selected ingredients include spices, herbs, salts, oils, proteins, alcohols, water, starches, sugars, preservatives, enzymes, vitamins, minerals, dairy products, natural and artificial flavoring agents, natural and artificial coloring agents, acids and gums. These ingredients add flavoring or nutritional value, impart a certain texture or simply extend storage life. Storage life is greater than one year, preferably greater than 18 months and more preferably even longer.

Alternatively, or in addition to a coating, one or more ingredients may be added to the dried noodles themselves. These ingredients, such as those described above, may be dispersed throughout the dried brick of noodles. Dispersion can be enhanced by introducing a substance into the noodle dough to encourage the additional ingredients to stick to the dried noodles. Selected ingredients may also be separately packaged as a flavor packet to be added to the noodles just before use.

Flavor packets may contains one or more ingredients such as water, spices, herbs, salts, oils, alcohols, starches, sugars, preservatives, enzymes, vitamins, minerals, dried dairy products, natural and artificial flavoring agents, natural and artificial coloring agents, acids and gums. The resulting flavor of the noodle product may be any flavor which is organoleptically pleasing. Examples of a few of the more popular flavors include hot and spicy, fried, curry, cajun, herb, garlic, chili, szechwan, soy, onion, sauteed or cheese. The dried noodles are packaged, with or without flavoring or flavor packets.

The manufacturing techniques used for these types of noodles easily lend themselves to automation. The dough can be prepared in bulk, sheeted onto moving surfaces, sliced, cut and steamed all along an assembly line. The dough can be rolled, sliced and steamed as it travels along a conveyor. As the drying step is performed in a relatively short time, ovens can be included in the assembly line without slowing the conveyor or overall manufacturing process.

The precooked and dried noodles, for example as soup, are quickly reconstituted by adding a quantity of boiling or hot water at between about 80° C. to about 105° C. Reconstitution occurs in less than 5 minutes and preferably in less than 3 minutes. Noodles rehydrate quickly because of their high degree of porosity. Cooked noodles have a firm ramen-type texture and favorable mouth feel and appearance. Surprisingly, these noodles have an organoleptically pleasing flavor uncharacteristic of non-fried noodles. The flavor of noodles in the absence of additional flavoring agents can be described as baked or somewhat fried-like, and the noodles become slightly browned.

Another embodiment of the invention is directed to noodles produced by the above methods. These noodles are unique in that they have a desirable flavor and appearance, but are manufactured without frying. Noodles have less than one-third the calories of conventionally fried noodles and may be classified as light or lite (less than 40 calories per serving; National Labeling Education Act). Noodles may also be low fat having less than 3 grams of fat per serving (National Labeling Education Act). Typically, noodle bricks have about 1 gram of fat per serving which is mostly due to the presence of fat in the wheat flour and not the addition of oil. Such noodles are highly commercially desirable and currently unavailable using the present frying or non-frying techniques. These noodles are also much healthier than fried noodles having no supplemental fats or oils other than possibly small quantities for flavoring. The noodles can even be further supplemented with vitamins and minerals to make a highly nutritious food product which satisfies 100% of the daily requirements of a normal adult. Such products would not be possible using conventionally fried noodles because of the unhealthy aspect of oil frying or alternative oil treatments which would always outweigh any positive nutritional aspects.

Instant-cooking noodles form edible products that can be used in soups and stews, or as side dishes or snacks. Noodles may be prepared plain or with different ingredients and different types of flavors. Examples of selected ingredients include spices, herbs, salts, oils, alcohols, water, starches, sugars, preservatives, enzymes, vitamins, minerals, dairy products, natural and artificial flavoring agents, natural and artificial coloring agents, acids and gums. Ingredients including flavorings can be added at any stage of the manufacturing process including the raw dough, the raw noodle ribbons, the during or after steaming, during or after drying, or directly added to the dried noodles. Popular flavors include hot and spicy, fried, curry, cajun, herb, garlic, chili, szechwan, soy, onion, sauteed or cheese. These flavors may also be added as separate packages of ingredients to be added to noodles immediately prior to being eaten. Separation of the flavoring agents from the noodles also allows for special packaging of these ingredients which may require more expensive materials that would otherwise react with the packaging of the noodles.

The long term storage option, the variability of flavors available and the ease of cooking render these noodles very desirable in a number of industries. These quick-cooking noodles are can be served to passengers on airlines, to soldiers as rations, or even to astronauts. The simplicity and rapidity by which the noodles can be prepared make them very desirable for sale to the public as well. Large quantities of dried ramen noodles can be prepared by automation. Noodles can be sold as dried bricks of noodles in lightweight flexible plastic wrap. Additional types of packaging include styrofoam or paper containers such as cups or bowls that, upon the addition of water, can be microwaved for single or multiple servings. When using individual-servings, sufficient space must be available in the containers for the addition of water and the expansion of the noodles as the water is absorbed.

The following examples illustrate embodiments of the invention, but should not be viewed as limiting the scope of the invention.

EXAMPLES

Example 1

Preparation of Fried Ramen Noodles (comparative)

500 parts of durum wheat flour were mixed with 150 parts water, 10 parts sodium chloride and 1 part of a chemical solution of sodium carbonate, sodium phosphate, potassium carbonate and cellulose gum in water. The components were mixed into a dough and formed into a continuous sheet with a thickness of about 1.2–1.8 mm. The sheeted dough was sliced with a 20 strand per 3 cm slitter into noodles and heated for 2 minutes with steam at about 1.0 kg/cm$^3$ in a tunnel steamer. The noodles had a water content of about 35%. Steamed noodles were immersed in vegetable oil at about 175° C. for 1 minute and cut into lengths of about 25 cm.

Example 2

Preparation of Non-Fried Ramen Noodles with Low Temperature Drying (comparative).

Dough was prepared as descried in example 1 and slit into noodles. Noodles were steamed for 2 minutes and dried in gas dryers at 90° C. for 45 minutes.

Example 3

Preparation of Non-Fried Ramen Noodles with High Temperature Drying.

Dough was prepared as described in example 1 and slit into noodles. Noodles were steamed for 2 minutes and dried in a double impingement dryer at 170° C. with air velocity set at 6,500 feet/minute for 4 minutes.

Example 4

Focus Group Testing of Ramen Noodles Prepared by Fried and Non-Fried Methods.

Noodles prepared according to Examples 1, 2 and 3, were rehydrated in boiling water for 3 minutes, flavored with a chicken flavoring and labeled samples A, B and C, respectively. Twenty healthy adult volunteers were divided into two groups of ten and given blinded samples of noodles prepared according to each method. Individuals were instructed to consider taste, mouth feel and texture, and determine the overall desirability of each of the samples. Seven in each group chose sample C as having the highest overall desirability. Scores for fried and conventionally dried noodles were about equal between the two groups.

Example 5

Test of Ramen Noodles Prepared by Fried and Non-Fried Methods using a Research Guidance Panel Test.

Panel tests of ramen noodles were performed which were designed to determine the effects of both wheat flour and drying temperatures on ramen noodle acceptability. Dough was prepared from either soft (S) or hard (H) wheat varieties basically as described in Example 1. Resulting noodles were dried using the conventional low temperature method (LT) or the high temperature method (HT) according to the invention.

A total of 350 participants were recruited, divided equally into four cell groups and each provided two different samples of dried noodle products. Cell group A received samples of S-LT and H-LT. Cell group B received samples of S-LT and S-HT. Cell group C received samples of H-LT and H-HT. Cell group D received sample of S-LT and S-HT. In all cases, noodles dried using the high temperature method were preferred. It was concluded that high temperature drying produced a more desirable noodle product and further that drying temperatures were more predictive of overall desirability even when compared with noodle composition.

Other embodiments and uses of the invention will be apparent to those skilled in the art from consideration of the specification and practice of the invention disclosed herein. It is intended that the specification and examples be considered exemplary only, with the true scope and spirit of the invention being indicated by the following claims.

We claim:

1. A method for drying ramen noodles without frying comprising the steps of:

a) mixing flour and water into a dough;

b) shaping the dough into noodles;

c) precooking the noodles in a fluid; and d) drying the precooked noodles in a flow of high velocity air for less than 30 minutes and at a temperature above 145° C.

2. The method of claim 1 wherein the flour is selected from the group consisting of wheat flour, farina flour, sorghum flour, corn flour, potato flour, rice flour, buckwheat flour, soybean flour and combinations thereof.

3. The method of claim 1 wherein the flour comprises a blend of winter wheat flours.

4. The method of claim 1 wherein the flour comprises a blend of hard and soft wheat flours.

5. The method of claim 1 wherein the flour comprises a blend of winter wheat and white wheat flours.

6. The method of claim 1 wherein the dough further comprises one or more ingredients selected from the group consisting of spices, herbs, salts, oils, proteins, starches, sugars, preservatives, enzymes, vitamins, minerals, dairy products, natural and artificial flavoring agents, natural and artificial coloring agents, acids and gums.

7. The method of claim 1 wherein the noodles are initially between about 0.5 mm to about 4 mm in diameter.

8. The method of claim 1 wherein the noodles are cut to between about 1.0 cm to about 100 cm in length before cooking.

9. The method of claim 1 wherein the fluid is steam.

10. The method of claim 1 wherein the noodles are precooked for between about 1 minute to about 10 minutes.

11. The method of claim 1 further comprising the step of adding a coating to a surface of the noodles before drying.

12. The method of claim 11 wherein the coating is applied by a technique selected from the group consisting of spraying, immersing, brushing and powdering the noodles.

13. The method of claim 11 wherein the coating comprises one or more ingredients selected from the group consisting of water, spices, herbs, salts, oils, alcohols, proteins, sugars, preservatives, enzymes, vitamins, minerals, dairy products, natural and artificial flavoring agents, natural and artificial coloring agents, acids and gums.

14. The method of claim 1 wherein the precooked noodles are dried using a dryer selected from the group consisting of impingement ovens, electric or gas ovens, convection ovens, dielectric ovens, air circulation dryers and combinations thereof.

15. The method of claim 1 wherein the flow of high velocity air is between about 2,000 to about 10,000 feet per minute.

16. The method of claim 1 wherein the flow of high velocity air is about 6,500 feet per minute.

17. The method of claim 1 wherein the precooked noodles are dried at a temperature between about 145° C. to about 210° C. for less than about 15 minutes.

18. The method of claim 1 wherein the precooked noodles are dried at a temperature greater than about 145° C. for less than about 8 minutes.

19. The method of claim 1 wherein the precooked noodles are dried at a temperature greater than about 175° C. for less than about 4 minutes.

20. The method of claim 1 wherein the precooked noodles are dried in a circulation dryer at between about 145° C. to about 205° C. for between about 3 to 12 minutes.

21. The method of claim 1 wherein the precooked noodles are dried in an impingement oven at between about 145° C. to about 185° C. for between about 2 to 8 minutes.

22. The method of claim 1 wherein the noodles expand to between about 1.0 mm to about 8 mm in diameter while drying.

23. The method of claim 1 wherein the dried noodles have a final water content of between about 5% to about 15% by weight.

24. The method of claim 1 wherein the noodles are dried to a final water content of between about 15% to about 50% by weight.

25. The method of claim 24 further comprising the step of refrigerating or freezing the dried noodles.

26. The method of claim 1 further comprising the steps of packaging the dried noodles and adding a flavor packet to the packaged dried noodles.

27. The method of claim 26 wherein the flavor packet contains one or more ingredients selected from the group consisting of water, spices, herbs, salts, oils, proteins, starches, sugars, preservatives, enzymes, vitamins, minerals, dried dairy products, natural and artificial flavoring agents, natural and artificial coloring agents, acids and gums.

28. The method of claim 26 wherein the flavor packet has a flavor selected from the group consisting of hot and spicy, fried, curry, cajun, herb, garlic, chili, szechwan, soy, onion, sauteed and cheese.

29. The method of claim 1 wherein the dried noodles are low-fat ramen noodles.

30. Dried ramen noodles prepared by the method of claim 1.

31. The dried ramen noodles of claim 30 which are low calorie.

32. The dried ramen noodles of claim 30 wherein the noodles are lite ramen noodles.

33. The dried noodles of claim 31 which when reconstituted with water have a firm texture, uniform porosity, favorable mouth feel and appearance, and baked flavor.

34. A method for producing a dried ramen noodle product comprising the steps of:
   a) mixing between about 40% to about 80% hard wheat flour and between about 20% to about 60% soft wheat flour with water to form a dough;
   b) shaping the dough into ramen noodles without adding an oil coating;
   c) precooking the ramen noodles with a heated fluid for between about 1 minute to about 10 minutes;
   d) drying the precooked ramen noodles in a flow of high velocity heated air to a final moisture content of less than 20%; and
   d) packaging the dried noodles to form the dried ramen noodle product.

35. The method of claim 34 wherein the hard and soft wheat flours are selected from the group consisting of white wheat flours, winter wheat flours, red wheat flours, durum wheat flours, spring wheat flours and mixed wheat flours.

36. The method of claim 34 wherein the noodles have a firm texture and high degree of porosity.

37. The method of claim 34 wherein the dried noodle products have a desirable taste when rehydrated.

38. A ramen noodle product prepared by the method of claim 34.

39. A method for producing a ramen noodle product having a baked flavor comprising the steps of:
   a) mixing wheat flour with between about 10% to about 60% water, by weight, to form a dough and shaping the dough into ramen noodles;
   b) precooking the ramen noodles without adding an oil coating with steam for between about 1 minute to about 10 minutes;
   c) drying the precooked ramen noodles in one step with a flow of high velocity air at between about 2,000 to 10,000 feet per minute to a final moisture content of less than 20% to create the baked flavor; and
   d) packaging the dried noodles to form the ramen noodle product.

40. The method of claim 39 wherein a flavor packet is added to the packaged noodle product.

41. The method of claim 40 wherein a flavor of the flavor packet is selected from the group consisting of hot and spicy, fried, curry, herb, garlic, cajun, chili, szechwan, soy, onion, sauteed and cheese.

42. A ramen noodle product prepared by the method of claim 39.

43. The ramen noodle product of claim 39 which is shelf stable for greater than one year.

44. The ramen noodle product of claim 39 which is low calorie and low fat.

45. An instant-cooking ramen noodle product containing ramen noodles, dried with a flow of high velocity air at between about 2,000 to 10,000 feet per minute and at a temperature of greater than 130° C. to about 210° C. for less than 15 minutes to a final moisture content of less than 15%, packaged in a disposable container and a flavoring.

46. A method for drying ramen noodles without frying comprising the steps of:

a) mixing flour and water into a dough;

b) shaping the dough into noodles without adding an oil coating;

c) precooking the noodles in a fluid; and d) drying the precooked noodles in a flow of high velocity air for less than 30 minutes and at a temperature above 130° C.

47. The method of claim 46 wherein the flow of high velocity air is between about 2,000 to about 10,000 feet per minute.

48. The method of claim 46 wherein the precooked noodles are dried at a temperature between about 145° C. to about 210° C. for less than about 15 minutes.

49. The method of claim 46 wherein the dried noodles have a final water content of between about 5% to about 15% by weight.

50. The method of claim 46 further comprising the step of refrigerating or freezing the dried noodles.

51. The method of claim 46 further comprising the steps of packaging the dried noodles and adding a flavor packet to the packaged dried noodles.

52. Dried ramen noodles prepared by the method of claim 46.

* * * * *